United States Patent [19]
Valoppi et al.

[11] Patent Number: 6,010,649
[45] Date of Patent: Jan. 4, 2000

[54] METHOD OF MAKING A LOW DENSITY, MOLDED INTEGRAL SKIN POLYURETHANE FOAM

[75] Inventors: Valeri L. Valoppi, Riverview; Elizabeth S. Bredeson, Newport, both of Mich.

[73] Assignee: BASF Corporation, Mt. Olive, N.J.

[21] Appl. No.: 09/000,742

[22] Filed: Dec. 30, 1997

[51] Int. Cl.[7] .......................... B29C 44/04; B29C 44/06
[52] U.S. Cl. .............................. 264/45.5; 264/51; 264/53
[58] Field of Search ................... 264/45.5, 51, 53

[56] References Cited

U.S. PATENT DOCUMENTS

| | | | |
|---|---|---|---|
| 5,100,922 | 3/1992 | Wada et al. | 521/51 |
| 5,211,873 | 5/1993 | Dams et al. | 252/182.24 |
| 5,350,777 | 9/1994 | Yuge et al. | 521/117 |
| 5,672,294 | 9/1997 | Lund et al. | 252/67 |
| 5,840,781 | 11/1998 | Dietrich et al. | 521/167 |
| 5,856,679 | 1/1999 | Barthelemy et al. | 252/182.24 |

FOREIGN PATENT DOCUMENTS

| | | | |
|---|---|---|---|
| 58-154714 | 9/1983 | Japan | 264/45.5 |
| 58-201621 | 11/1983 | Japan | 264/45.5 |

*Primary Examiner*—Allan R. Kuhns
*Attorney, Agent, or Firm*—Fernando A. Borrego

[57] ABSTRACT

It has been found that non-chlorinated pentafluoropropane blowing agents may be used alone or in combination with water in a method of making flexible integral skin foams. For example, foams prepared using 1,1,1,3,3-pentafluoropropane (HFA-245fa) alone or in combination with water exhibit physical characteristics such as resistance to abrasion and cracking on flex comparable to conventional chlorinated fluorocarbon blown foams. The method of the the present invention produce foams which are suitable for use in many applications including, for example, shoe soles.

15 Claims, No Drawings

METHOD OF MAKING A LOW DENSITY, MOLDED INTEGRAL SKIN POLYURETHANE FOAM

FIELD OF THE INVENTION

The present invention relates to integral skin foams and a process for preparing such foams. More particularly, the invention relates to a method of making integral skin foams employing pentafluoropropane as the sole blowing or with water as a co-blowing agent.

BACKGROUND OF THE INVENTION

Integral skin foams are well known to those skilled in the art of polyurethane foams. Such foams have a cellular interior and a higher density microcellular or non-cellular skin. In general, to prepare such foams an organic isocyanate is reacted with a substance having at least one isocyanate reactive group in the presence of a catalyst, blowing agent, and a variety of optional additives. The reaction is carried out in a mold where a higher density skin forms at the interface of the reaction mixture and the relatively cool inner surface of the foam.

Historically, the most common types of blowing agent used in integral skin polyurethane foams have been chlorofluorocarbons (CFCs) or combinations of CFCs and other blowing agents. However, in view of recent mandates calling for a reduction and eventually elimination of the use of CFCs, alternatives are considered necessary.

Past methods of preparing integral skin polyurethanes with CFCs as a blowing agent includes G.B. Patent No. 1,209,297, which teaches the use of a combination blowing agent consisting of a CFC and hydrate of an organic compound which splits off water at temperatures above 40° C. This blowing agent or combination of agents was used in a formulation with a suitable polyisocyanate, a polyol containing hydroxyl group and a catalyst. This patent discloses that free water in the system leads to a skin that is permeated with fine cells, which is undesirable.

Attempts have been made to evaluate the performance of alternate blowing agents to CFCs. In a paper by J. L. R. Clatty and S. J. Harasin entitled, *Performance of Alternate Blowing Agents to Chlorofluorocarbons in RIM Structural and Elastomeric Polyurethane Foams*, presented to the Annual Polyurethane Technical/Marketing Conference, October 1989, the authors addressed the use of water as a blowing agent for integral skin polyurethane reaction injection molded systems (RIM). In this application, the water concentration in the system is controlled by the concentration and type of molecular sieves used. As in the Great Britain patent discussed previously, the water is not in a free form but bound in some manner. In this instance, the authors state that this process is limited to use in rigid foam systems; and the flexible integral skin formulations may best be served by using HCFCs or HCFC-22 as substitutes for CFCs.

A recently employed integral skin foam formulation is described in U.S. Pat. No. 5,100,922 to Wada et al. which relates to a method for producing a molded product of integral skin polyurethane foam. The method comprises reacting and curing (1) a high molecular weight polyol comprising, as the main component, a polyoxyalkylene polyol having, as the main constituent, oxyalkylene groups of at least 3 carbon atoms and oxyethylene groups at its molecular terminals with the overall oxyethylene group content being not higher than 15% by weight and having a hydroxyl value of not higher than 80, (2) a crosslinking agent containing a compound having an aromatic nucleus and at least two active hydrogen containing groups selected from the group consisting of hydroxyl groups, primary amino groups and secondary amino groups, and (3) a polyisocyanate, in a mold in the presence of a catalyst and a hydrogen atom containing halogenated hydrocarbon foaming agent. While an extensive list of blowing agents are provided, the only pentafluoro compounds described are chlorinated compounds such as 3,3-dichloro-1,1,1,2,2-pentafluoropropane and 1,3-dichloro-1,1,2,2,3-pentafluoropropane, which are considered undesirable.

More recently U.S. Pat. No. 5,506,275, issued to Valoppi, the present inventor, which relates to the use of 1,1,1,2-tetrafluoroethane as an alternative to conventional chlorinated fluorocarbon blowing agents in integral skin foam formulations. While this patent offers an alternative to halogenated hydrocarbon blowing agents per se, 1,1,2-tetrafluoroethane (HFC-134a) boils at −26.5° C. and thus requires special gas delivery systems to introduce and maintain the blowing agent in solution, especially in warm weather conditions, i.e., above 90° F. As such, still further improvements in the art are considered necessary.

It has been found that foams utilizing pentafluoropropane blowing agents and, in particular, 1,1,1,3,3-pentafluoropropane as the blowing agent alone or in combination with limited amounts of water can be prepared which meet the stringent requirements inherent to integral skin foam applications such as an acceptable appearance and must exhibit enhanced resistance to abrasion and cracking upon flex. Further, the pentafluoropropane blowing agents utilized in association with the present invention are generally soluble in resinous solution thus eliminating or greatly reducing the need for specialized gas delivery systems to maintain pressure on the system.

SUMMARY OF THE INVENTION

It is the object of the present invention to provide a flexible, low density, integral skin polyurethane foam capable of use in various applications comprising the reaction product of;
  a) a polyisocyanate component; and
  b) an active hydroxy functional polyol composition; in the presence of
  c) a blowing agent including a non-chlorinated pentafluoropropane and optionally water;
  d) a catalyst; and
  e) optionally one or more compounds selected from the group consisting essentially of chain extenders, a surfactant, an alcohol having from 10 to 20 carbons, fillers, pigments, antioxidants, stabilizers and mixtures thereof.

The general process comprises reacting a polyisocyanate component with an isocyanate reactive compound in the presence of a catalyst of a type known by those skilled in the art and a non-chlorinated pentafluoropropane blowing agent optionally in association with water as a co-blowing agent. A catalyst which assists in controlling foam formation may be used as well as a surfactant to regulate cell size and structure.

DETAILED DESCRIPTION OF A PREFERRED EMBODIMENT OF THE INVENTION

The organic polyisocyanates used in the instant process contain aromatically bound isocyanate groups. Representative of the types of organic polyisocyanates contemplated herein include, for example, 1,4-diisocyanatobenzene, 1,3-diisocyanato-o-xylene, 1,3-diisocyanato-p-xylene, 1,3-diisocyanato-m-xylene, 2,4-diisocyanato-1-nitrobenzene, 2,5-diisocyanato-1-nitrobenzene,m-phenylene diisocyanate, 2,4-toluene diisocyanate, 2,6-toluene diisocyanate, mixtures of 2,4- and 2,6-toluene diisocyanate, 4,4'-biphenylmethane diisocyanate, 4,4'diphenylmethane diisocyanate, 3,3'-4,4'-diphenylmethane diisocyanate, and 3,3'-dimethyldiphenylmethane-4,4'-diisocyanate; the triisocyanates such as 4,4',4"-triphenylmethane triisocyanate, polymethylene polyphenylene polyisocyanate, and 2,4,6-toluene triisocyanate; and the tetraisocyanates such as 4,4-dimethyl-2,2'-5'-diphenylmethane tetraisocyanate. Especially useful due to their availability and properties are 2,4'-diphenylmethane diisocyanate, 4,4'-diphenylmethane diisocyanate, polymethylene polyphenylene polyisocyanate and mixtures thereof.

These polyisocyanates are prepared by conventional methods known in the art such as the phosgenation of the corresponding organic amine. Included within the usable isocyanates are the modifications of the above isocyanates which contain carbodiimide, allophanate, alkylene or isocyanurate structures. Quasi-prepolymers may also be employed in the process of the subject invention. These quasi-prepolymers are prepared by reacting an excess of organic polyisocyanate or mixtures thereof with a minor amount of an active hydrogen containing compound determined by the well known Zerewitinoff Test, as described by Kohler in *Journal of the American Chemical Society*, 49, 3181 (1927). These compounds and their methods of preparation are well known in the art. The use of any one specific active hydrogen compound is not critical hereto; rather, any such compound can be employed herein. Generally, the quasi-prepolymers have a free isocyanate content of from 20 percent to 40 percent by weight.

Mixtures of polymeric diphenylmethane diisocyanate (polymeric MDI) and carbodiimide or urethane modified MDI are preferred.

The isocyanate reactive composition, otherwise referred to herein as an active hydroxy-functional polyol composition may include any suitable polyoxyalkylene polyether polyol such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediols, 1,5-pentanediol, 1,6-hexanediol, 1,7-heptanediol, glycerol, 1,1, 1-trimethylolpropane, 1,1,1-trimethylololethane or 1,2,6-hexanetriol. Any suitable alkylene oxide may be used such as ethylene oxide, propylene oxide, butylene oxide, amylene oxide and mixtures of these oxides. The polyoxyalkylene polyether polyols may be prepared from other starting materials such as tetrahydrofuran and alkylene oxidetetrahydrofuran mixtures, epihalohydrins such as epichlorophydrin, as well as aralkylene oxides such as styrene oxide. The polyoxyalkylene polyether polyols may have either primary or secondary hydroxyl groups. Included among the polyether polyols are polyocyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process, such as the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Other polyoxyalkylene polyether polyols which may be employed are those which contain grafted therein vinylic monomers.

The polyols which have incorporated therein the vinylic polymers may be prepared (1) by the in situ free radical polymerization of an ethylenically unsaturated monomer or mixture of monomers in a polyol, or (2) by dispersion in a polyol of a preformed graft polymer prepared by free radical polymerization in a solvent such as described in U.S. Pat. Nos. 3,931,092; 4,014,846;, 4,093,573 and 4,122,056; the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. RE 28,715 and unsaturated polyols such as those described in U.S. Pat. No. 3,652,659 and RE 29,014 may be employed in preparing the graft polymer dispersions used in the instant invention, the disclosures of which are incorporated by reference.

Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927 and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such a maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylopropane allyl ether, pentaerythritol allyl ether, pentaerythitol vinyl ether, pentaerythritol diallyl ether, and 1-butene-3,4-diol, unsaturated epoxides such as 1-vinycyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4- pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyloxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetam, inoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylaminde, N-butylacrylamide, methacryl formamide and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl butyrate, isopropenyl acetate, vinyl formate vinyl methacrylate, vinyl methoxyacetate, vinyl benzoate, vinyl iodide, vinyltoluene, vinyinaphthalene, vinyl bromide, vinyl fluoride, vinylidene bromide, 1-chloro-1-fluoroethylene, vinylidene fluoride, vinyl methyl ether, vinyl other, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(β-chloroethyl)vinyl phosphonate, vinyl ethyl sulfide, vinyl ethyl sulfone, N-methyl-N-vinyl acetamide, N-vinyl pyrrolidene, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itacotric acid, dichlorbutadiene, vinyl pyridine, and the like. Any of the known polymerizable monomers can be used, and the compounds listed above are illustrative and not restrictive of the monomers suitable for use in this invention. Preferably, the monomer is selected from the group consisting of acrylonitrile, styrene, methyl methacrylate, and mixtures thereof.

The total amount of active hydroxy-functional polyol composition employed in accordance with the teachings of the present invention includes from about 60 pbw to about 100 pbw based on a total of 110 parts by weight (pbw) for the resin and a foam index of between about 96–104. More preferably the total amount of active hydroxyl-functional polyol composition will be from about 65 pbw to about 95 pbw based on a total parts by weight of the resin of 110.

Illustrative initiators which may be employed for the polymerization of vinyl monomers are the well known free radical types of vinyl polymerization initiators, for example, the peroxides, persulfates, perborates, percarbonates, azo compounds, etc. including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-α-cumyl-peroxide, dipropyl peroxide, diisopropyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenyl methyl hydroperoxide, diphenylmethyl hydroperoxide, α,α'-azobis(2-methyl)heptonitrile, 1,1-azo-bis(1-cyclohexane)carbonitrile, dimethyl α,α'azobis (isobutyroitrile), 4,4-'azobis(cyanopetanoic) acid, azobis (isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo) isobutyronitrile, 2-t-butylazo-2-cyanobutane, 1-cyano-1-(t-butylazo)cyclohexane, t-butyl peroxy-2-ethylhexanoate, t-butyl perpivalate, 2,5-dimethylhexane-2,5-diper-2-ethylhexoate, t-butylperneo-decanoate, t-butyl perbenzoate, t-butyl percrotoate, persuccinic acid, diisopropyl peroxydicarbonate and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840, which comprises a copolymer having a first portion composed on an ethylenically unsaturated monomer or mixture of such monomers and a second portio which is a propylene oxide polymer. Other stabilizers which may be employed are the alkylene oxide adducts of copolymers of styrene-allyl alcohol.

The preferred polyols are polyethers having an average functionality of about 1.75 to about 3.0 and a molecular weight range of from about 3500 to about 5100. The most preferred polyols are polyethers which are copolymers of ethylene oxide and propylene glycol glycerine or trimethylolpropane. Include with this group are the previously described graft polymer dispersions.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyidimethylamine, N,N,N'-trimethylisopryl propylenediamine, 3-diethylaminopropyldiethylamine, dimethylbenzylamine and the like. Other suitable catalysts are, for example, dibutyltin dilaurate, dibutyltin d/acetate, stannous chloride, dibutyltin di-2-ethyl hexanoate, stannous oxide, available under the FOMREZ® trademark, as well as other organometallic compounds such as are disclosed in U.S. Pat. No. 2,846,408.

An alcohol having from about 10 to about 20 carbons or mixtures thereof may be used in the present invention. Alcohols of this type are known to those skilled in the art. The types of alcohols contemplated are commonly produced via the oxo process and are referred to as oxo-alcohols. Examples of some commercially available products include LIAL 125 from Chemica Augusta Spa or NEODOL® 25 produced by Shell. Such alcohols are known for enhancing cross-linking, thereby improving tear resistance.

While surface active agents are generally not needed to solubilize the blowing agent of the present invention, in contrast to other known blowing agents, surface active agents, i.e., surfactants, may be employed, for example, to regulate the size cell size and structure of the resulting foams. Typical examples of such surface active agents include siloxane oxyalkylene heterol polymers and other organic polysiloxanes, oxyethylated alkyl phenol, oxyethylated fatty alcohols, fluoroaliphatic polymeric esters, paraffin oils, castor oil ester, phthalic acid esters, ricindolic acid ester, and Turkey red oil, as well as cell regulators such as paraffins.

Chain extending agents which may be employed in the present invention include those having two functional groups bearing active hydrogen atoms. A preferred group of chain extending agents includes ethylene glycol, diethylene glycol, propylene glycol, dipropylene glycol, or 1,4-butanediol and mixtures thereof.

Additives which may be used in the process of the present invention include anti-oxidants, known pigments, such as carbon black, dyes and flame retarding agents (e.g., trischloroethyl phosphates or ammonium phosphate and polyphosphate), stabilizers against aging and weathering, plasticizers, such as gamma butylactone, fungistatic and bacteriostatic substances and fillers.

The blowing agent of the present invention includes a non-chlorinated pentafluoropropane compound and particularly 1,1,1,3,3-pentafluoropropane, otherwise known as HFA-245fa. The pentafluoropropane blowing agent is used either alone or in conjunction with water in amounts sufficient to provide the desired foam density. Depending upon the amount of water employed as a co-blowing agent and the pack factor of the molded component, the amount of non-chlorinated pentafluoropropane blowing agent employed will generally range from about 0.5 pbw to about 10 pbw, and more preferably from about 1.0 to 8.0 pbw based on a total of 110 parts by weight of the resin for foams having molded densities of from 2 pcf to about 40 pcf. By way of non-limiting example, the amount of pentafluoropropane used as the sole blowing agent for a shoe sole or the like will generally range from about 1.5 pbw to about 5.0 pbw for foams having molded densities of from 25 pcf to about 35 pcf at a molded pack factor of 1.5–3.0. By way of further example, the amount of pentafluoropropane used as a sole blowing agent for a steering wheel will generally range from about 2.0 pbw to about 8.0 pbw for foams having molded densities of from 25 pcf to about 35 pcf with a pack factor of 2.0–6.0. As water is added as a co-blowing agent, the amount of non-chlorinated pentofluoro blowing agent is proportionately reduced. In general, up to about 0.25 pbw of water may be employed as a co-blowing agent and more preferably between about 0.05 pbw to about 0.17 pbw based on a total of 110 parts by weight of the resin.

The mechanical parameters of the instant process are flexible and depend on the final application of the integral skin polyurethane foam. The reaction system is versatile enough that it may be made in a variety of densities and hardnesses. The system may be introduced into a mold in a variety of ways known to those skilled in the art. It may be shot into a preheated closed mold via high pressure injection technique. In this manner, it processes well enough to fill complex molds at low mold densities (from 19 pcf to 25 pcf). It may also be run using a conventional open mold technique wherein the reaction mixture or system is poured or injected relatively at low pressure or atmospheric pressure into a preheated open mold. In the instant process, the system may be run at mold temperatures from about room temperature to about 120° F. with room temperature being preferred.

Having thus described the invention, the following examples are given by way of illustration with all amounts being given in parts by weight unless otherwise indicated.

| | |
|---|---|
| Density ASTM D-1622 | Split Tear ASTM D-1938 |
| Tensile Strength ASTM D-412 | Graves Tear ASTM D-42 Die C |
| Tensile Elongation ASTM D412, Die A | Shore Hardness ASTM D-2240 Ross Flex ASTM |
| Taber Abrasion ASTM 1044 | 1052 |

| | |
|---|---|
| Polyol A | is a propylene glycol initated polyoxypropylene polyoxyethylene block copolymer having a hydroxyl number of about 25 and a molecular weight of about 3850. |
| Polyol B | is a 31 percent solids, 1:1, acrylonitrile:styrene graft copolymer dispersed, in a trimethylolpropane initiated polyoxypropylene-polyoxyethylene block copolymer having a molecular weight of about 4120. The graft polymer dispersion has a hydroxyl number of about 25. |
| Polyol C | is a glycerine initiated polyoxypropylene-polyoxyethylene block copolymer having a hydroxyl number of about 27 and a molecular weight of about 5050. |
| XFE-1028 | is an amine catalyst comprising a proprietary blend available from Air Products. |
| T-12 | is dibutyltin dilaurate. |
| 6-25 | is an amine catalyst comprising a proprietary blend available from Air Products. |
| WB 3092 | is a prepolymer prepared from uretonimine modified isocyanate and propylene glycol having a free NCO content of 24 wt. % and a viscosity of 120 cps at 25° C. |
| CFC-11 | is 1 fluoro-1,1,1-frichloromethane. |
| HFA-245fa | is 1,1,1,3,3-pentafluoropropane. |
| HFC-134a | is 1,1,1,2-tetrafluoroethane. |
| iso A | is a solvent-free 50/50 weight percent blend of diphenylmethane diisocyanate and a urethane-modified polymethylene polyphenylpolyisocyanate prepolymer, wherein the blend has an isocyanate content of 23 weight percent. |

TABLE 1

Foam Formulations

| Component | 1 pbw | 2 pbw | 3 pbw | 4 pbw | 5 pbw | 6 pbw | 7 pbw | 8 pbw |
|---|---|---|---|---|---|---|---|---|
| Polyol A | 66.8 | 66.8 | 66.8 | 66.8 | 66.8 | 66.8 | 66.8 | 66.8 |
| Polyol B | 20 | 20 | 20 | 20 | 20 | 20 | 20 | 20 |
| Polyol C | 7 | 7 | 7 | 7 | 7 | 7 | 7 | 7 |
| 1,4-BDO | 6 | 6 | 6 | 6 | 6 | 6 | 6 | 6 |
| EG | 0.2 | 0.2 | 0.2 | 0.2 | 0.2 | 0.2 | 0.2 | 0.2 |
| XF-E1028 | 1.3 | 1.3 | 1.3 | 1.3 | 1.3 | 1.3 | 1.3 | 1.3 |
| T-12 | 0.03 | 0.03 | 0.03 | 0.03 | 0.03 | 0.03 | 0.03 | 0.03 |
| S-25 | 0.02 | 0.02 | 0.02 | 0.02 | 0.02 | 0.02 | 0.02 | 0.02 |
| CFC-11 | 5.2 | 7.5 | | | | | | |
| HFC-134A | | | 2.1 | 2.5 | | | | |
| HFA-245fa | | | | | 2.7 | 5.1 | | |
| Water | 0.2 | 0.2 | 0.2 | 0.2 | 0.2 | 0.2 | 0.38 | 0.50 |
| WB 3092 | | | | | | | | |
| OH #g | 127.1 | 127.1 | 127.1 | 127.1 | 127.1 | 127.1 | 138.4 | 145.5 |
| ISO A | 38.78 | 37.96 | 39.94 | 39.78 | 39.71 | 38.81 | | |
| ISO B | | | | | | | 41.92 | 44.13 |

Initially it should be noted that the blowing agent was added in quantities to produce similar free rise densities for all solvent blown foams to ensure similar pack factors so that the skin thickness is caused only by the blowing agent condensing on the mold surface. As should be understood by those skilled in the art, the phrase pack factor is the ratio of the free rise density to the molded density of the resulting foam.

Resin systems were foamed with the blowing agents being added such that a master batch of resin was produced combining all components except the blowing agent. Karl Fischer method for water determination was performed and residual water was determined to be 0.20%. This value was used to determine all resin/prepolymer ratios. The liquid blowing agents (CFC-11 and HFA-245fa) were added to the resin system and then mixed. Blowing agent was added until a constant amount of blowing agent was obtained after mixing. Gaseous blowing agent (HFC-134a) was added to 2000 g of resin via a gas dispersion tube (20C Pyrex) from a pressurized cylinder (supplied by DuPont) equipped with a gas regulator. The resin was charged to a round bottom 3-neck flask. The resin was kept cool by placing the flask in an ice water bath while addition took place so that higher levels of HFC-134a could be added before saturation. A metal stir shaft connected to a motor kept the resin stirring at approximately 500 rpm. The third arm of the round bottom was connected to a cold finger with dry ice/isopropyl alcohol mixture for reflux of blowing agent. The cold finger was equipped with a bubbler to regulate the flow of gas. The addition was timed and final weight of blowing agent obtained by measuring the change in weight of the flask. A total percentage of blowing agent in the resin was then calculated. Water was also tested as a blowing agent by adding it directly to the resin and a Karl Fisher water determination was performed.

Each of the resin blowing agent compositions were added directly into a quart Lily cup for foaming. Enough of the resin/blowing agent composition was added to produce foam which flowed over the lip of the quart cup so that free rise densities could be measured. The appropriate amount of prepolymer was weighed directly into the Lily cup. The mixture was then stirred for 7 seconds with a Vorath 3½" mix blade at 2000 rpm. Foam cream, gel, top of cup, rise and tack free times were noted. The net weight of the foam produced was taken and foam density calculated: g×0.059= lb/ft$^3$. The resultant free rise densities and reactivity profiles are given in TABLE II.

The foam components were weighed so that the final total weight is equal to the weight needed in the mold plus approximately 50 g hang-up in the Lily cup. The desired plaque molded density was 30 lb/ft$^3$ (0.48 g/cc). After stirring, the foam was poured into a 12"×6"×⅜" aluminum mold heated to 120° F. which has been sprayed lightly with silicone mold release. After 4 minutes, the plaque was demolded and trimmed. The net weight of the plaque was taken and foam density calculated (g/442 cc=g/ml). After 1 week curing time, physical properties were tested as reported in Table III below.

As demonstrated in Table III, the cream time of HFA-245fa is slightly faster than CFC-11 but not quite as fast as R-134a. This is probably because the boiling point of HFA-245fa is in between that of CFC-11 and HFC-134a. Because of the volatility, HFA-245fa (b.p.=15.3° C.) escapes faster from the resin than CFC-11 (b.p.=23.8° C.) but not as fast as HFC-134a (b.p.=26.5° C.). It may be deduced that HFA-245fa is therefore more soluble in the resin matrix than HFC-134a but not quite as soluble as CFC-11. Solubility studies were not carried out due to limited availability of HFA-245fa. The reported cream time of HFC-134a is not the actual cream but a frothing of the resin caused by the blowing agent boiling out. It is believed that the slightly faster cream of HFA-245fa compared with CFC-11 is due to the same boiling out effect but to a much lesser extent than HFC-134a.

On a molar basis, HFA-245fa appears to be a more efficient blowing agent than CFC-11. At the lower free rise density (9 lb/ft$^3$), HFA-245fa is not as efficient a blowing agent as HFC-134a but is equally efficient a blowing agent as HFC-134a at the higher free rise density of 12.5 lb/ft$^3$.

When comparing the parts of blowing agent needed to produce a desired free rise density, HFA-245fa is a more efficient blowing agent than CFC-11 at both 9.0 and 12.5 lb/ft$^3$ densities. When comparing blowing efficiency with HFC-134a, it can be seen that more blowing agent is required for both 9.0 lb/ft$^3$ and 12.5 lb/ft$^3$. However, the cost associated with the added volume is believed to be more than offset by eliminating the need for specialized transfer and storage equipment, especially at higher temperatures.

At the higher free rise density, namely 12.5 lb/ft$^3$, HFA-245fa produced foam with superior tensile strength and tear strength to the HFC-134a blown foams (see TABLE III). The HFA-245fa blown foam properties are only slightly lower than those of CFC-11 blown foams with the exception of lower elongations and abrasion resistance. The abrasion resistance for the HFA-245fa foam (104 mg loss) is still well under the industry standard of less than 200 mg loss. It is believed that the slightly lower Ross Flex modulus at this free rise density is not indicative of poorer flex properties but instead due to a split in the hand mix foam.

TABLE II

Reactivities and Free Rise Densities

| Blowing Agent | 1<br>CFC-11 | 2<br>CFC-11 | 3<br>HFC-134a | 4<br>HFC-134a | 5<br>HFA-245fa | 6<br>HFA-245fa | 7<br>Water | 8<br>Water |
|---|---|---|---|---|---|---|---|---|
| Cream Time | 18 | 15 | 11 | 12 | 15 | 12 | 17 | 15 |
| Gel Time | 33 | 25 | 21 | 24 | 26 | 29 | 30 | 25 |
| Top of Cup | 44 | 48 | 30 | 25 | 32 | 32 | 49 | 30 |
| Rise Time | 86 | 70 | 81 | 71 | 61 | 61 | 63 | 58 |
| Tack Free | 59 | 65 | 60 | 64 | 48 | 59 | 44 | 43 |
| Free Rise Density | 12.8 | 9.4 | 12.4 | 9.4 | 12.6 | 8.9 | 16.5 | 12.5 |

At 9 lb/ft$^3$ free rise density, tensile and elongations are superior to those of the CFC-11 blown foams and all other physical properties are equal. Again, the properties of the HFA-245fa blown foam are far superior to that of the HFC-134a blown foam. The hardness of HFA-245fa blown foams is similar to that of CFC-11 blown foams. Foams blown with HFC-134a tend to be softer.

As expected, all solvent blowing agents produced foams with superior physical properties to those of water blown foams. This is especially evidenced in tear strength. The water blown foams used for comparison had free rise densities of 16.5 lb/ft$^3$ and 12.5 lb/ft$^3$, respectively. The higher free rise density (16.5 lb/ft$^3$) was used due to ease in handling and does not flash out of the mold or produce flow lines on final parts. The lower free rise density (12.5 lb/ft$^3$) was used as comparison since the greatest pack factor could be obtained in a water blown formulation.

Foams blown with HFC-245fa produce a well-defined thick skin as determined by Scanning Electron Microscopy (SEM). Skin thicknesses were not quantitatively measured due to the high variability in skin formation of hand mix plaques. It can be seen in comparison that at both 9 lb/ft$^3$ and 12.5 lb/ft$^3$ free rise density, HFC-245fa blown foams exhibit skin thicknesses about equal to that of CFC-11 blown foams. HFC-245fa produced skins far superior to those foams blown with HFC-134a. Due to its high volatility, HFC-134a does not produce a thick-skinned foam. As expected, water exhibited very little true skin since no condensation is taking place at the mold surface.

When used in an integral skin system, HFC-245fa produces foam with superior physical properties and skin thickness to foams blown with HFC-134a. When comparing the HFC-245fa blown foams to foams blown with CFC-11, HFC-245fa produced foams which rival CFC-11 blown foams in both physical properties and skin thickness. In practice, the use of HFC-245fa is believed to be an improvement over HFC-134a, since it is easier to handle, does not require special gas handling equipment, and produces foam with excellent physical properties and skin thickness. Further, foams employing HFC-245fa as a blowing agent, and particularly integral skin foams, can be used to form articles having a relatively broad molded density, i.e., from about 2.0 pcf to about 40.0 pcf.

While it will be apparent that the preferred embodiments of the invention disclosed are well calculated to fulfill the objects stated, it will be appreciated that the invention is susceptible to modification, variation and change without departing from the spirit thereof.

We claim:

1. A method of making a low density, molded integral skin polyurethane foam article comprising the steps of:
   a) providing an organic polyisocyanate;
   b) providing a resin comprising;
      i) an active hydroxy functional polyol composition;
      ii) a blowing agent including non-chlorinated 1,1,1,3,3-pentafluoropropane and optionally water;
      iii) a catalyst; and
      iv) optionally one or more compounds selected from the group consisting essentially of chain extenders, a surfactant, an alcohol having from 10 to 20 carbons, fillers, pigments, antioxidants, stabilizers and mixtures thereof; and
   c) introducing components a) and b) into a mold and reacting the components for a period of time sufficient to produce a molded integral skin polyurethane article.

2. A method as recited in claim 1 wherein said non-chlorinated pentafluoropropane is present in an amount of from about 0.5 parts by weight to about 10.0 parts by weight based on 110 parts by weight of b)i–b)iv).

3. A method as recited in claim 1 wherein said blowing agent includes water in an amount of from about 0.05 parts by weight to about 0.17 parts by weight based on 110 parts by weight of b)i)–b)iv).

4. A method as recited in claim 1 wherein said active hydroxy functional polyol composition is selected from the group consisting of polyoxyalkylene polyether polyols, vinyl polymer grafted polyoxyalkylene polyether dispersions and mixtures thereof.

5. A method as recited in claim 1 wherein said active hydroxy functional polyol composition is present in an amount of from about 50.0 parts by weight to about 95.0 parts by weight based on 110 parts by weight of b)i)–b)iv).

6. A method as recited in claim 1 wherein said chain extender is selected from the group consisting of ethylene glycol, diethylene glycol, propylene glycol, dipropylene glycol, butanediol and mixtures thereof.

7. A method as recited in claim 1 wherein said alcohol containing from 10 to 20 carbons is an aliphatic alcohol.

8. A method of making flexible low density, molded integral skin polyurethane foamn articles comprising the steps of:
   a) providing an organic polyisocyanate;
   b) providing a resin comprising;
      i) an active hydroxy functional polyol composition;
      ii) a blowing agent consisting essentially of non-chlorinated 1,1,1,3,3-pentafluoropropane;
      iii) a catalyst; and
      iv) optionally one or more compounds selected from the group consisting essentially of chain extenders, a surfactant, an alcohol having from 10 to 20 carbons, fillers, pigments, antioxidants, stabilizers and mixtures thereof; and
   c) introducing components a) and b) into a mold and reacting the components for a period of time sufficient to produce a flexible molded integral skin polyurethane article.

9. A method as recited in claim 8 wherein said non-chlorinated pentafluoropropane is present in an amount from about 0.5 parts by weight to about 10.0 parts by weight based on 110 parts by weight of b)i)–b)iv).

10. A method as recited in claim 8 wherein said blowing agent further includes water.

11. A method as recited in claim 10 wherein said water is included in an amount from about 0.05 parts by weight to about 0.17 parts by weight based on 110 parts by weight of b)i)–b)iv).

12. A method as recited in claim 8 wherein said active hydroxy functional polyol composition is selected from the group consisting of polyoxyalkylene polyether polyols, vinyl polymer grafted polyoxyalkylene polyether dispersions and mixtures thereof.

13. A method as recited in claim 8 wherein said active hydroxy functional polyol composition is present in an amount of from about 50.0 parts by weight to about 95.0 parts by weight based on 110 parts by weight of b)i)–b)iv).

14. A method as recited in claim 8 wherein said chain extender is selected from the group consisting of ethylene glycol, diethylene glycol, propylene glycol, dipropylene glycol, butanediol and mixtures thereof.

15. A method as recited in claim 8 wherein said alcohol containing from 10 to 20 carbons is an aliphatic alcohol.

* * * * *